United States Patent [19]

Hayashi

[11] Patent Number: 5,105,267
[45] Date of Patent: Apr. 14, 1992

[54] COLOR CONVERSION APPARATUS

[75] Inventor: Tadao Hayashi, Yokohama, Japan

[73] Assignee: Ricoh Company, Ltd., Tokyo, Japan

[21] Appl. No.: 401,826

[22] Filed: Sep. 1, 1989

[30] Foreign Application Priority Data

Sep. 26, 1988 [JP] Japan .................. 63-238826

[51] Int. Cl.⁵ ........................... G03F 3/8; H04N 1/46
[52] U.S. Cl. ........................................ 358/80; 358/75
[58] Field of Search .................. 358/75, 80; 346/154, 346/157; 355/326

[56] References Cited

U.S. PATENT DOCUMENTS

| | | | |
|---|---|---|---|
| 4,488,245 | 12/1984 | Dalke et al. | 358/80 |
| 4,517,590 | 5/1985 | Nagashima et al. | |
| 4,667,250 | 5/1987 | Murai | 358/75 |
| 4,758,885 | 7/1988 | Sasaki et al. | 358/75 |
| 4,855,765 | 8/1989 | Suzuki et al. | 358/80 |
| 4,887,151 | 12/1989 | Wataya | 358/75 |
| 4,896,208 | 1/1990 | Moriya et al. | 358/75 |
| 4,931,860 | 6/1990 | Narumiya | 358/75 |

Primary Examiner—James J. Groody
Assistant Examiner—Michael H. Lee
Attorney, Agent, or Firm—Oblon, Spivak, McClelland, Maier & Neustadt

[57] ABSTRACT

A color conversion apparatus in use with a digital image processing sysetm in which image data is represented by digital data of three separated colors. The apparatus has a colorimetric system converter for separately converting the separated color data into chromaticity data and value data and a designating device for designating an original color and a converted color. A discrimination device discriminates whether or not the chromaticity data from the colorimetric system converter is coincident with the chromaticity data of an original color designated by the designating device. A selecting device selects one of the chromaticity data from the colorimetric system converter and the chromaticity data of an original color designated by the designating device on the basis of the discrimination result.

21 Claims, 6 Drawing Sheets

COLOR CONVERSION APPARATUS

BACKGROUND OF THE INVENTION

1. Field of the Invention

The present invention relates to a color conversion apparatus in use with a digital image processing system.

2. Discussion of the Background

There have been known various types of digital color image processing systems, such as a digital color copying machine, color facsimile, and color display. The image processing systems have been widely used, while involving problems to urgently be solved. Some of the problems are found in the color conversion, "$\gamma$" conversion, and operation in a mono color mode.

The color conversion problem will first be given. Japanese Patent Application Laying Open Publication No. 58-142669 disclosed a typical color conversion apparatus in a digital color image processing system. In the color conversion apparatus, a color image on an original is read in terms of separated color image signals. The separated color signals representing color image data are stored. One of the correspondences of the image signals as read and the colors of ink are selected. By using the selected ink and image signal, an image based on the selected image signal is printed on a recording medium.

The color conversion apparatus is thus based on the selection of the correspondence between the read image data and the inks used for image printing. Varieties of the colors that can be converted are limited to R (red), G (green) and B (blue) or Y (yellow), M (magenta) and C (cyan). Therefore, other colors than a color to be converted (referred to as an original color) are often contained in a color it is converted (color after converted). Prediction of the color to be converted is uncertain.

The digital image processing system based on the color conversion apparatus is currently being marketed. In the system, the color to be converted is lack of gradation data in connection with the original color. Accordingly, the original color and the colors located in the vicinity of the original color (in a color space), when converted, become all the same color.

The "$\gamma$" conversion problem may be found in Japanese Patent Application Laying Open Publication No. 59-161970. In the image processing system of this gazette, three "$\gamma$" correction circuits are provided for the separated color signals R, G and B and are provided and operated referenced to ROMs. Since the 2 high-order bits in the ROMs may be used for controlling the "$\gamma$" correction, the "$\gamma$" conversion is simultaneously carried out. To effect the "$\gamma$" conversion, a multiplier may be used. In this case, however, a value correction cannot be directly applied to the separated color signals R, G and B. Further, additional calculation works are needed and a complicated circuit arrangement is also required.

The mono color problem may be found in the image processing system disclosed in Japanese Patent Application Laying Open Publication No. 58-142670. In a mono color mode, the system reads the separated color image data of R, G and B from a memory one time or a plurality of times, and uses the read image data for printing. Accordingly, the number of colors to be printed in a mono color mode is limited to the primary colors (R, G, B) or the secondary colors (Y, M and C) and tertially color (Bk). However, recent market demands for the mono color print are to obtain an image of a desired single color.

SUMMARY OF THE INVENTION

The present invention overcomes the above problems and disadvantages of the prior art by providing a novel color conversion apparatus system in use with a digital color image processing system.

Accordingly, an object of the present invention is to provide a color conversion apparatus system in use with a digital color image processing system which changes only a chromaticity of a color while maintaining a gradation of an original color.

Another object of the present invention is to provide a color conversion apparatus in use with a digital color image processing system in which control of a value alone can be applied to the separated color signals of R, G, and B, while maintaining a chromaticity of an original color image.

A further object of the present invention is to provided a color conversion apparatus in use with a digital color image processing system which is able to print an image of a desired single color.

According to an aspect of the present invention, there is provided a color conversion apparatus in use with a digital image processing system in which image data is represented by digital data of three separated colors comprising colorimetric system converting means for converting the separated color data into chromaticity data and value data, means for designating an original color and a color it is converted, means for discriminating whether or not the chromaticity data from the colorimetric system converting means is coincident with the chromaticity data of an original color designated by the designating means, and means for selecting one of the chromaticity data from the colorimetric system converting means or the chromaticity data of a color it is converted, which is designated by the designating means, on the basis of the discrimination by the discriminating means.

With such an arrangement, the image data is separated into value data and chromaticity data. The color conversion process is applied to only the chromaticity data. Therefore, the chromaticity along can be converted while maintaining a value of en original color.

According to another aspect of the present invention, there is provided a color conversion apparatus in use with a digital image processing system in which image data is represented by digital data of three separated colors comprising a colorimetric system converting means for converting the separated color data into chromaticity data and value data, means for designating a "$\gamma$" conversion together with a "$\gamma$" value, means for outputting a code representative of a "$\gamma$" value as is entered by the designating means, and means for converting the value data from the colorimetric system converting means in accordance with the "$\gamma$" value code from the code output means.

With the above arrangement, "$\gamma$" conversion data, a "$\gamma$" value, is entered into the "$\gamma$" value code output means by the designating means. The value converting means converts only the value in accordance with the "$\gamma$" conversion data from the "$\gamma$" value code output means, while keeping the chromaticity of an original color unconverted.

According to yet another aspect of the present invention, there is provided a color conversion apparatus in use with a digital image processing system in which image data is represented by digital data of three separated colors comprising colorimetric system converting means for converting the separated color data into chromaticity data and value data, means for designating a desired single color, mono color mode set-up means for outputting a mono color mode select signal in response to designation of a desired single color by the designating means, and means for selecting the chromaticity data from the colorimetric converting means or the chromaticity data of the single color designated by the designating means in accordance with the mono color mode select signal from the mono color mode set-up means.

With such an arrangement, the image data is separated into value data and chromaticity data. The color conversion apparatus is applied to only the chromaticity and chroma data. Therefore, a desired single color can be obtained while maintaining a value of an original color.

According to a further aspect of the present invention, there is provided a color conversion apparatus in use with a digital image processing system in which image data is represented by digital data of three separated colors comprising a colorimetric system converting means for converting the separated color data into chromaticity data and value data, means for designating an original color and a color to be converted, a "γ" value as well as a "γ" conversion, and a desired single color, means for discriminating whether or not the chromaticity data from the colorimetric system converting means is coincident with the chromaticity data of an original color designated outputting a code representative of a "γ" value as is entered by the designating means, and for outputting a mono color mode select signal in response to designation of a desired single color by the designating means, means for converting the value data derived from the colorimetric system converting means in accordance with the "γ" value code derived from the control means, and means for selecting the chromaticity data from the colorimetric system converting means or the chromaticity data of an original color designated by the designating means on the basis of the discrimination by the discriminating means, and the selecting means for selecting the chromaticity data from the colorimetric converting means or the chromaticity data of the single color designated by the designating means in accordance with the mono color mode select signal from the mono color mode set-up means.

With such an arrangement, the image data is separated into value data and chromaticity data. The chromaticity of an original color can be converted to a desired one, while keeping a value of the original color. If necessary, a single color change is possible, while keeping a value of the original color. Additionally, if required, only a value of an original color can be converted while the chromaticity of the original color can be kept unconverted.

Other objects, features and advantages of the present invention will be apparent when carefully reading the following description in connection with the accompanying drawings, in which:

DESCRIPTION OF THE PREFERRED EMBODIMENTS DETAILED

A color conversion apparatus in use with a digital color image processing system according to the present invention will now be described with reference to the accompanying drawings.

Figure 1:
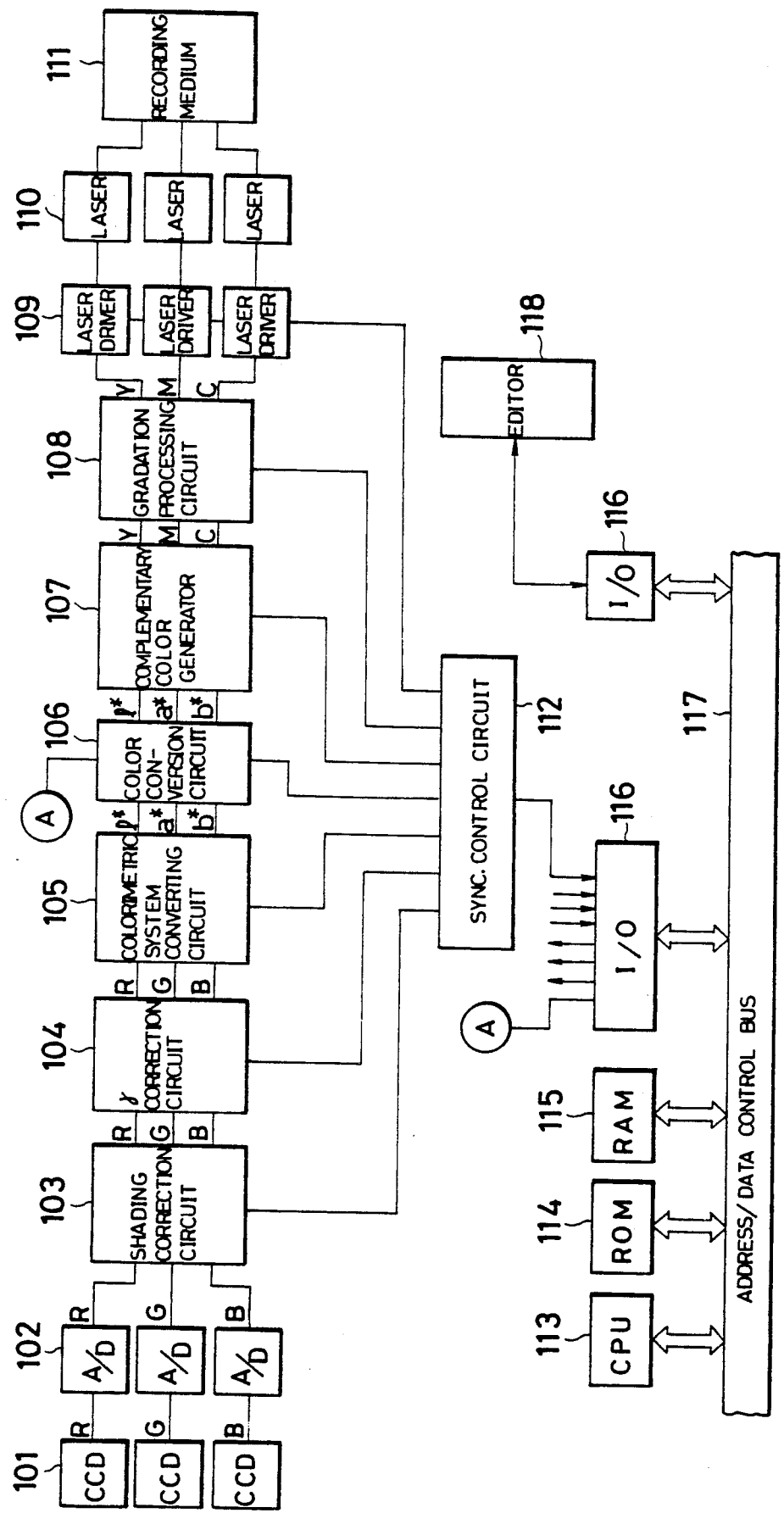
FIG. 1 is a block diagram showing an overall color image processing system incorporating a color conversion apparatus according to the present invention.

Reference is first made to FIG. 1 showing in block form a digital image processing system, such as a color copying machine, which incorporates a color conversion apparatus according to the present invention. In the figure, three CCDs 101 sense the light reflected at a color image on an original, such as a document and photograph, and convert the amounts of color image light into electrical quantities. These CCDs are respectively provided with three color filters of three primary colors, red (R), green (G) and blue (B). Each of these color filters allow only the light of its color to pass therethrough. For example, the red color filter allows the red light alone to pass therethrough. The electrical signals of these CCDs 101 are analog data signals containing the color image information. The analog data signals are applied to A/D converters 102, respectively. The A/D converters convert the analog quantities of these data signals into digital quantities, respectively. The A/D converters 102 output these digital quantities in the form of digital image data signals R, G and B. The trio of the digital data signals R, G, and B are applied to a shading correction circuit 103. The shading correction circuit 103 corrects variances in the characteristics of the CCD chips, that will be contained in the digital data signals R, G, and B. The image data signals R, G and B outputted from the shading correction circuit 103 are applied to a "γ" correction circuit 104. The "γ" correction circuit corrects the deviated gradations of the image data signals R, G, and B. The data signals R, G and B derived from the "γ" correction circuit enter a colorimetric system converting circuit 105. The circuit 105 converts the data signals R, G and B respectively into data signals l*, a* and b*, Here, l* indicates a Munsell value. a* and b* indicate chromaticity, or chroma. These factors l*, a* and b* cooperate to form a color space defining all of the colors. The l*, a* and b* data derived from the colorimetric system converting circuit 105 are converted into desired l*, a* and b* data in accordance with the directions by a CPU 113. The instructions to the CPU 113 may be entered by a suitable designating means, such as an editor 118 in this instance. The directions by the CPU reach the color change circuit 106, by way of an address data control bus 117, and an I/O port 116. The CPU 113, editor 118, bus 117, I/O port 116, etc. form a designating means. The converted data l*, a* and b* are applied to a complementary color generating circuit 107. The circuit 107 converts the data l*, a* and b* into color data of yellow (Y), magenta (M) and cyan (C) (in this instance) in accordance with a recording medium. These color data enter a gradation processor 108. The processor 108 converts the color data into 2-level data or multilevel data in accordance with laser drivers 109 and a recording medium 111. The thus converted color data signals Y, M and C, respectively, enter the laser drivers 109 which in turn drive lasers 110. Finally, a color image of the original is recorded on the recording medium 111 with the laser beams emitted from the lasers 110. The operations of the color image data processings progress under sync control by a sync control circuit 112 To this end, the circuit 112 produces a clock signal corresponding to the pixels as viewed in the main scan direction and a line signal corresponding to the lines as viewed in the vertical scan direction. ROM 114 and RAM 115 are for storing programs, variables, and the like. The access to these memories for data transfer to and from them is made by the CPU 113. An editor 118 is provided for designating an original color and a color to be converted, and the like.

Details of the colorimetric system converting circuit 105 and the color conversion circuit 106 will be described in detail with reference to FIG. 2.

In the figure, reference numeral 201 designates a colorimetric system converting circuit for converting the color image data signals R, G, and B into the data $l^*$, $a^*$ and $b^*$. The image data signals R, G and B and the data $l^*$, $a^*$ and $b^*$, which cooperatively form a color space, have a one to one correspondence for the same color. In other words, a set of the data $l^*$, $a^*$ and $b^*$ is uniquely provided for a set of the data R, G and B. The data $l^*$, $a^*$ and $b^*$ constitute a coordinate system defining a constant-hue space as provided by CIE (commission internale de l'Eclairage). A Munsell value converter 202 is for converting the value $l^*$. It is converted into $l^{*'}$, in accordance with the value of "$\gamma$" that is transferred from the CPU 113. The value $l^{*'}$, as has been subjected to the "$\gamma$" conversion process (conversion of the value $l^*$), is supplied to the succeeding complementary generating circuit 107 (FIG. 1). The converted data $a^*$ and $b^*$ are derived from the colorimetric system converting circuit 201, and are transferred to a port A of a selector 203, and a port A of a discriminating circuit 204. Chromaticity data $a1^*$ and $b1^*$ representative of colors to be converted are applied to a port B of the selector 203. The port A or port B is selected by an output signal of the discriminating circuit 204. Additionally, chromaticity data $a2^*$ and $b2^*$ representative of original colors are applied to a port B of the discriminating circuit 204. When the chromaticity data applied to the port A of the discriminating circuit 204 are coincident with the chromaticity data to the port B, the discriminating circuit 204 produces a signal representing A=B. The A=B signal serves as a select signal to select the port B of the selector 203. Accordingly, when the pixel under processing has an original color (chromaticity only), it is converted into a converted, color (chromaticity only). When it has another chromaticity, it is outputted as intact. Therefore, only a specific color in the original can be converted into a desired color. At this time, a gradation (in a gray level) of a part of the original image whose color has been converted can be maintained. It is noted that the value $l^*$ can be operated independently of the color conversion operation, and its operation is easy.

Figure 3:
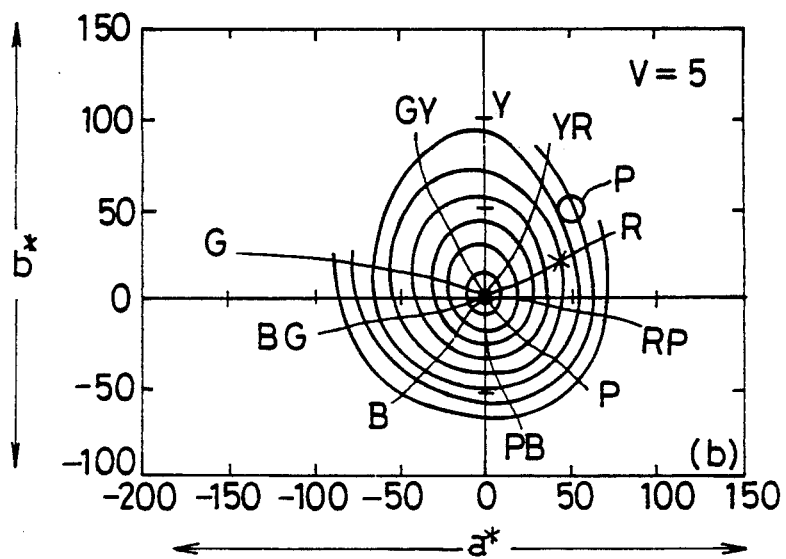
FIG. 3 graphically represents isochromes of hue and chroma in the Munsell colorimetric apparatus.

Turning now to FIG. 3, there are plotted isochromes of hue and chrome in the Munsell colorimetric system in a plane of the $a^*$ and $b^*$ coordinates Where ($a2^*$, $b2^*$)=(50, 30) is selected for an original color, and ($a1^*$, $b1^*$)=(−40, −30), for a color to be converted, red at the indicated chroma in an original or document can be converted into blue at the indicated chroma. Further, a port B select signal of the selector 203 that comes from the discrimination circuit 204 is OR tied with a mono color signal transferred through the I/O 116 from the CPU 113, and the ORed signal is kept at logical "1" during the image data processing. With this arrangement, the $a1^*$, $b1^*$ at the port B of the selector 203 is constantly selected, so that a mono color image expressed by the data $a1^*$, $b1^*$ can be copied. In this case, if $l^{*'}=l^*$ after "$\gamma$" conversion, the original mono color image can be reproduced while keeping a gradation of the original image. Accordingly, if the value of "$\gamma$" is varied during the "$\gamma$" conversion process, the mono color copy obtained has a gradation in accordance with the varied "$\gamma$" value. In FIG. 3, character P indicates an area within an original color. Original colors existing within the area P are all converted into the same color.

Figure 4:
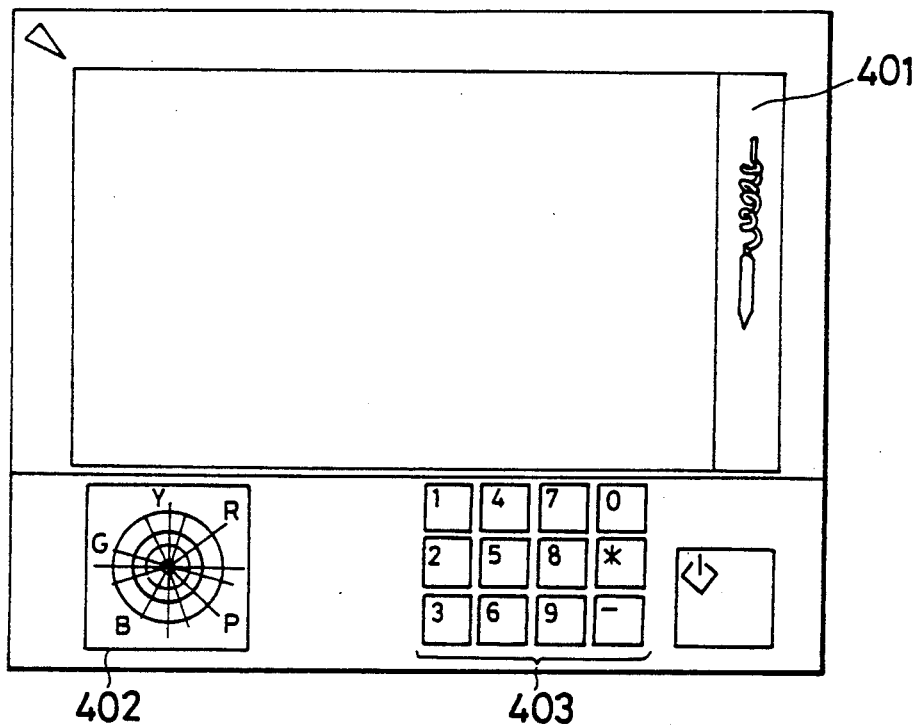
FIG. 4 is a plan view of an operation section assembled into the image processing system of FIG. 1.

FIG. 4 shows a plan view of an operating unit for designating colors. In designating the original color and the color after it is converted by an operator or a copy operator, to directly designate a color in an original, he designates the coordinates of the color on an original by using an editor 401. In case that an operator desires to designate a color not existing in ar original or to designate a color while confirming its position in a chromaticity chart, a chromaticity chart 402 is used. In this case, if the chromaticity chart 402 is so designed to present actual colors, not the coordinates, to the operator, the operability is improved. A section designated as reference numeral 403 indicates ten keys for other operations of the copier including the "$\gamma$" value settings.

Figure 5:
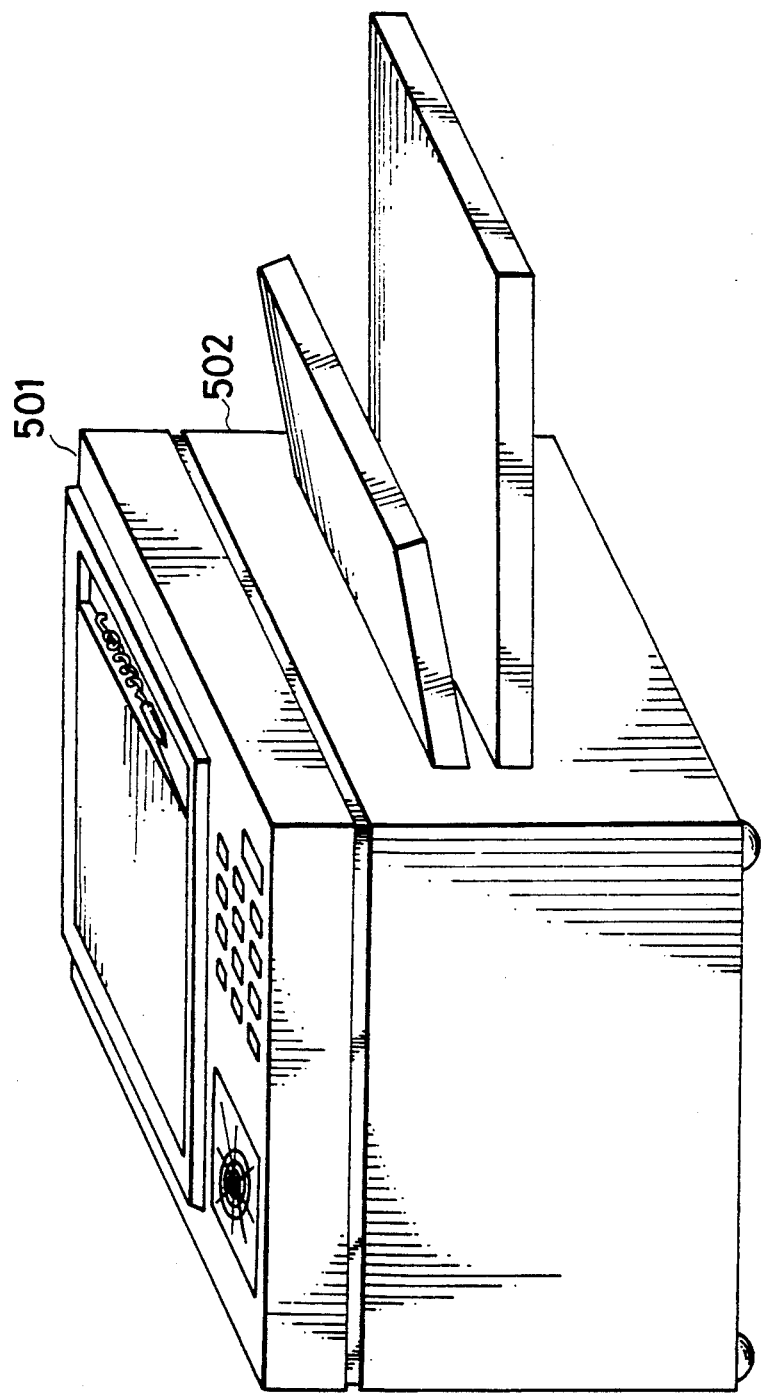
FIG. 5 shows an exterior of the image processing system of FIG. 1.

FIG. 5 shows an exterior of the color copying machine or copier as the digital color image processing system. In the figure, an image reader 501 contains the CCDs 101 and the circuits 102 to 108, and the sync control circuit 112, CPU 113, memories 114 and 15, and I/Os 116 (FIG. 1), and the operating unit including the editor 401, chromaticity chart 402 and ten keys 403. The image reader 501 reads color image data, appropriately processes the data, and finally sends the processed image data to a printer section 502. The printer section 502 includes the laser drivers 109, lasers 110, and recording medium 111. When receiving the image data from the image reader 501, the printer section records it in the recording medium 111. The printer section 502 is additionally provided with basic color copying functions to reproduce a color image by the subtracting mixture of colors, the process three primary colors, Y, M and C. The units necessary for these process colors, such as developing units, are provided, with the same number as that of the process colors.

Figure 2:
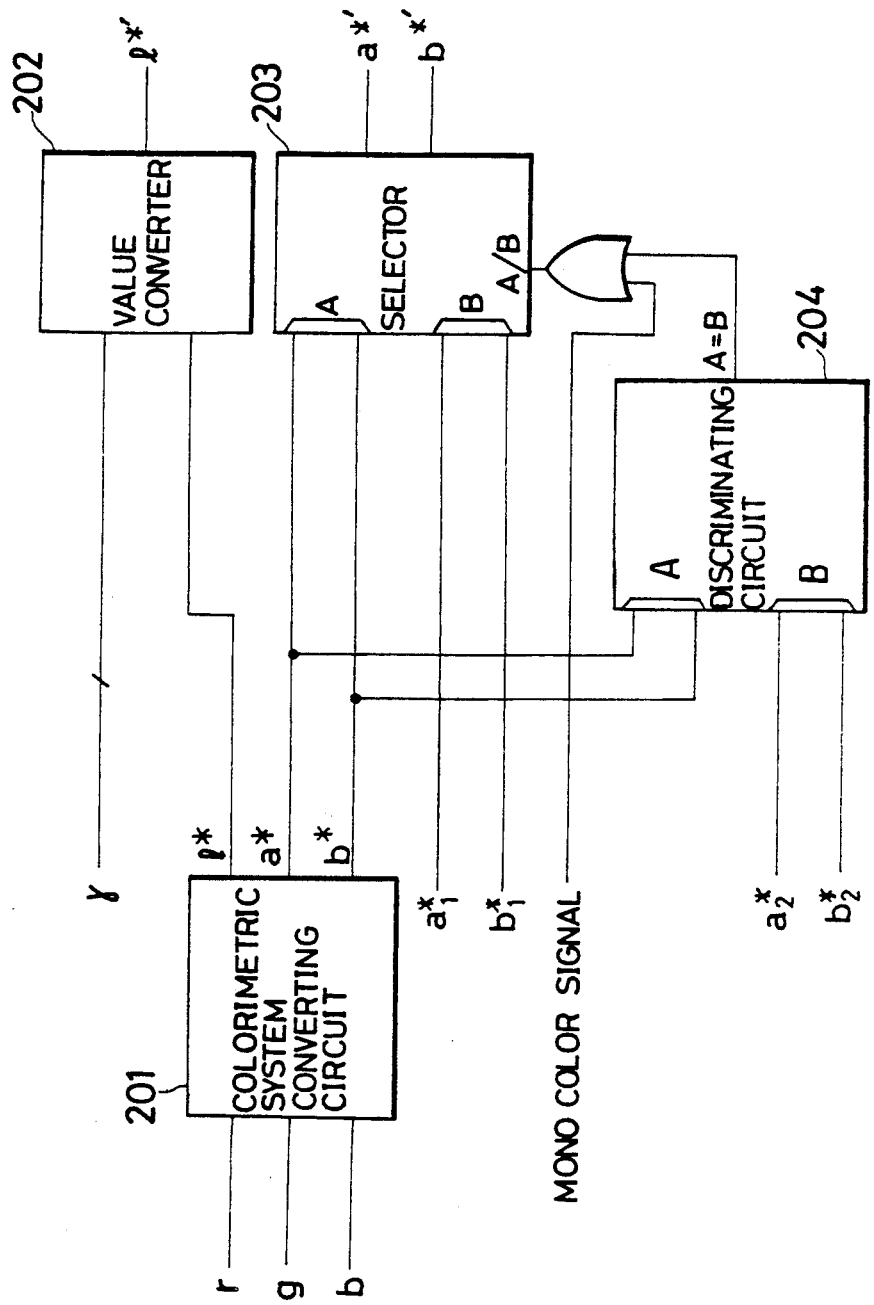
FIG. 2 is a block diagram showing a color conversion section of the color image processing system of FIG. 1.
Figure 6:
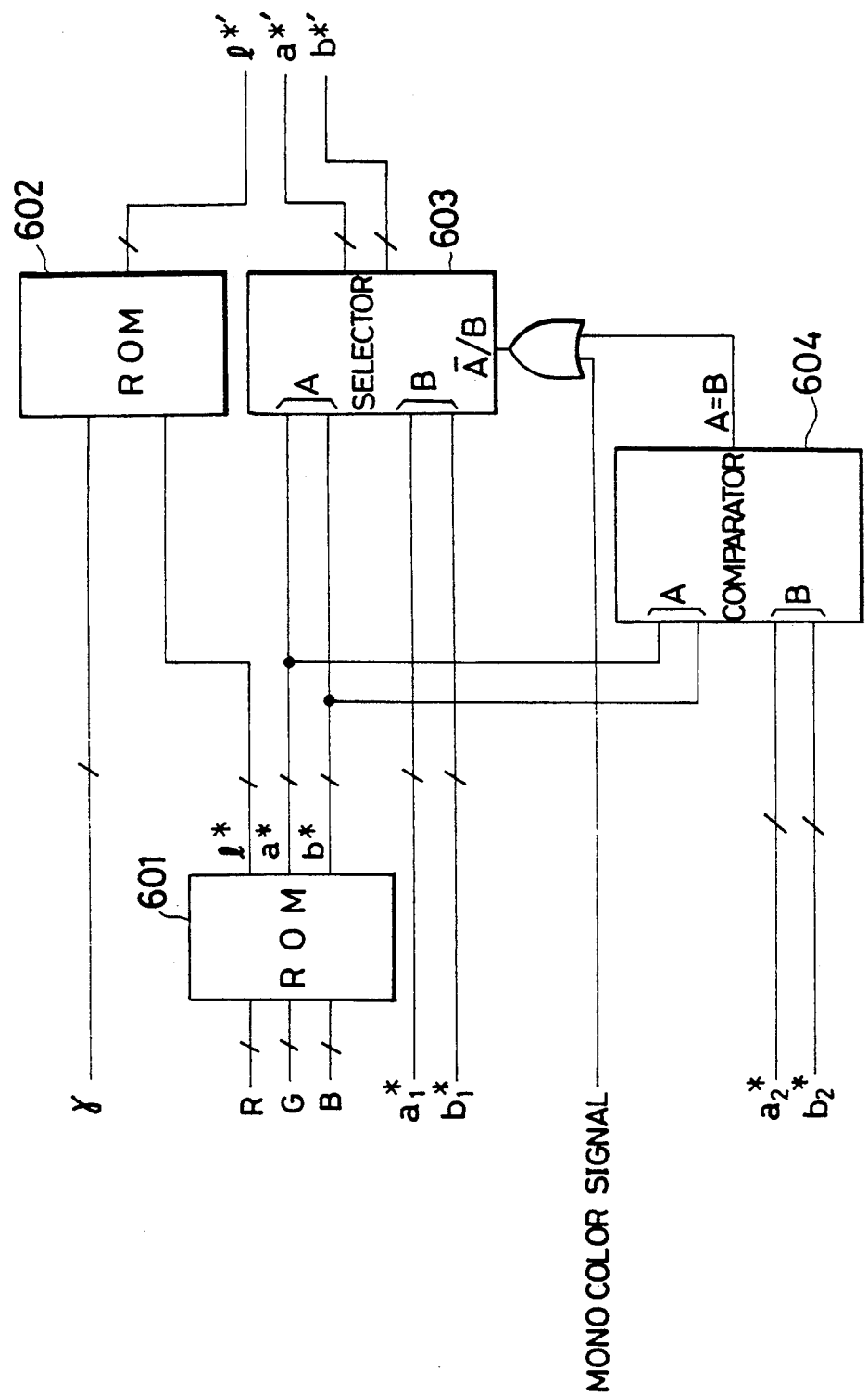
FIG. 6 is a block diagram showing a specific circuit of the color conversion section of FIG. 2.

A specific circuit of the circuit of FIG. 2 is shown in FIG. 6. The lines R, G and B led from the left side of the ROM 601 are address lines, while the lines $l^*$, $a^*$ and $b^*$ from the right side are data lines. With this, a set of image data R, G and B applied as the address to the ROM 601 uniquely define a set of $l^*$, $a^*$ and $b^*$ as the output data of the ROM 601. A ROM 602 as the value converter receives a value "$\gamma$" as the high-order bit of its address, and receives the $l^*$ as the low-order bit. Accordingly, when accessed by the address consisting of "$\gamma$" and $l^*$, the ROM 602 produces converted data of "$\gamma$" that depends on the "$\gamma$" value. A comparator 604 compares data $a^*$ and $b^*$ applied to the port A with data $a2^*$ and $b2^*$ applied to the port B. When both the input data are coincident with each other, the comparator 604 produces a select signal A=B in logical "1". The select signal of logical "1" selects the port B receiving the data a1* and b1*. At this time, the output data a1*' and b1*' of the selector 603 are: a*'=a1* and b*'=b1*. When the select signal is A≠B, a*'=a* and b*'=b*.

In the comparison by the comparator 604, only several high-order bits of the data a* and b* and a2* and b2* are used, while neglecting the remaining low-order bits. With this, the original color may be selected from among some varieties of a color. It is assumed now that the data a* and b* consist of 8 bits and expresses ±128, and that only the 5 high-order bits are used for comparison. On this assumption, if (a2*, b2*)=(50, 50), the chromaticity within the area P in FIG. 3 are all converted into a1*, b1*.

Figure 7:
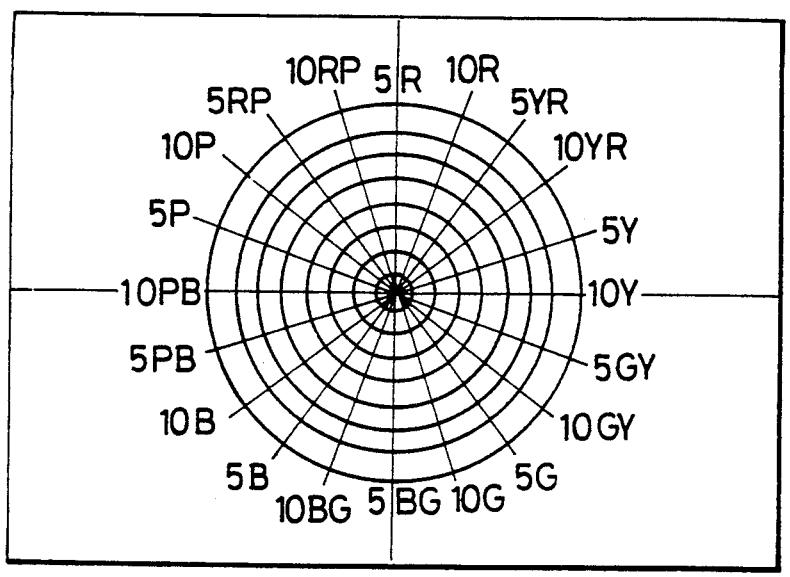
FIG. 7 graphically represents isochromes of hue and chroma in the H, C, V colorimetric system.

The color conversion apparatus according to the present invention may be modified such that the color R, G and B in the colorimetric system into colors in the H, C and V system. In the H, C and V system, colors are defined by three attributes or factors: hue, chroma and value. A graphical illustration of this system is shown in FIG. 7. As shown, straight lines radially extending from an origin represent isochromes of hue. Circles concentrically arrayed indicate isochromes of chroma. Value is represented by a line vertically from the origin of the H - V plane and orthogonal to that plane. To realize the color conversion, the circuit of FIG. 6 is rearranged such that the ROM 601 for the R, G, B→l*, a* and b* conversion is replaced by a ROM for R, G, B, H, C, V, and the value is converted by a ROM exclusively used for value conversion. Further, the chromaticity chart (coordinates chart) 402 in FIG. 4 is replaced by the H, C, V coordinates chart as shown in FIG. 7. The color conversion for the same hue may be carried out on the isochrome line of that hue. The color conversion for the color of the same chroma may be carried on the isochrome circle of that chroma. In this way, the colors of the same hue and the same chroma may readily be converted to the other color.

As seen from the foregoing description, when a color is converted to another by the color conversion apparatus according to the present invention, the image data as the separated color image data are separated into value data and chromaticity data. Only the chromaticity data is converted, while keeping a gradation of the original color. Therefore, even if the color conversion process is applied to a halftone image, the color to be converted may reliably be predicted and its quality is satisfactory.

Many widely different embodiments of the present invention may be constructed without departing from the spirit and scope of the present invention. It should be understood that the present invention is not limited to the specific embodiments described in the specification, except as defined in the appended claims.

What is claimed is:

1. A color conversion apparatus in use with a digital image processing system in which image data is represented by digital data of three separated colors, comprising:
   colorimetric system converting means for converting the separated color data into chromaticity data and value data;
   means for designating an original color and a color to be converted;
   means for discriminating whether or not the chromaticity data from said colorimetric system converting means is coincident with the chromaticity data of an original color designated by said designating means; and
   means for selecting the chromaticity data of the color to be converted, which is designated by said designating means, when the coincidence is detected by said discriminating means and for selecting the chromaticity data from said colorimetric system converting means when the coincidence is not detected by said discrimination means.

2. The color conversion apparatus to claim 1, in which said colorimetric system converting means is a ROM containing data for converting the separated color data signals of R (red), G (green), and B (blue) to color data of factors l*, a* nd b* defining a color space.

3. The color conversion apparatus according to claim 1, in which said colorimetric system converting means is a ROM containing data for converting the separated color data signals of R (red), G (green), and B (blue) to color data of factors H, C, and V defining an H, C and V color coordinates.

4. The color conversion apparatus according to claim 1, in which said designating means is an editor with a chromaticity chart.

5. The color conversion apparatus according to claim 1, in which said designating means is an editor with an H, C and V color coordinates chart.

6. The color conversion apparatus according to claim 1, in which said designating means is an editor capable of visual presenting an actual color that an operator desired to designate.

7. The color conversion apparatus according to claim 1, in which said discriminating means is a comparator for comparing the chromaticity data from said colorimetric system converting means with the chromaticity data of an original color designated by said designating means, and for producing a signal of a first logical level for transmission to said selecting means when the coincidence is detected by said discriminating means.

8. The color conversion apparatus according to claim 7, in which when said comparator compares the chromaticity data derived from said colorimetric system converting means with the chromaticity data of an original color designated by said designating means, some low-order bits are not used.

9. The color conversion apparatus according to claim 1, in which said selecting means includes a first port coupled with the output of said colorimetric system converting means, a second port coupled with the chromaticity data of an original color designated by said designating means, a control terminal coupled with an output of said discriminating means, and an output coupled with the succeeding stage in said digital color image processing system, and when receiving at said control terminal the output signal of the first logic level from said comparator, said selecting means selects the chromaticity data as is received at said second port and outputs the same from said output.

10. The color conversion apparatus according to claim 1, further comprising:
   means for designating a "γ" conversion together with a "γ" value:
   means for outputting a code representative of a "γ" value as is entered by said designating means; and
   means for converting the value data from said colorimetric system converting means into desired value data in accordance with said "γ" value code from said code output means.

11. The color conversion apparatus according to claim 10, in which said designating means for designating an original color and a converted color and said designating means for designating a "γ" conversion together with a "γ" value are contained in an editor.

12. The color conversion apparatus according to claim 10, in which said code output means coupled for transfer with said value converting means and for reception with said designating means, and said code output means including a CPU, memories, interface, and bus for transferring various data signals including said "γ" value code.

13. The color conversion apparatus according to claim 10, in which said value converting means is a ROM containing data for converting the value data from said colorimetric system converting means in accordance with said "γ" value code.

14. The color conversion apparatus according to claim 1, further comprising
means for designating a desired single color;
mono color mode set-up means for outputting a mono color mode select signal in response to designation of a desired single color by said designating means; and
means for selecting the chromaticity data from said colorimetric converting means or the chromaticity data of said single color designated by said designating means in accordance with the mono color mode select signal from said mono color mode set-up means.

15. The color conversion apparatus according claim 14, in which said designating means for designating an original color and a color bo be converted and said designating means for designating a desired single color contained in an editor.

16. The color conversion apparatus according to claim 14, in which said colorimetric system converting means is a ROM containing data for converting the separated color data signals of R (red), G (green), and B (blue) to color data of factors l*, a* and b* defining a color space.

17. The color conversion apparatus according to claim 14, in which said colorimetric system converting means is a ROM containing data for converting the separated color data signals of R (red), G (green), and I; (blue) to color data of factors H, C, and V, defining an H, C and V color coordinates.

18. The color conversion apparatus according to claim 14, in which said designating means for designating a desired single color is capable of visual presenting an actual color that an operator desires to designate.

19. The color conversion apparatus according to claim 14, in which said mono color mode set-up means includes at least a CPU, interface, and bus, and said mono color mode set-up means being coupled for reception with said designating means and for transfer with said select means.

20. The color conversion apparatus according to claim 14, in which said selecting means includes a first port coupled with the output of said colorimetric system converting means, a second port coupled with the chromaticity data of the single color designated by said designating means, a control terminal coupled with said mono color mode set-up means, and an output coupled with the succeeding stage in said digital color image processing system, and when receiving at said control terminal a mono color mode set-up signal from said mono color mode set-up means, said selecting means selects the chromaticity data of the single color as is received at said second port and outputs the same from said output.

21. A color conversion apparatus according to claim 1, further comprising:
means for converting the value data from said colorimetric system converting means into desired value data; and
a color data generating means for generating color data based on the desired value data and the selected chromaticity data.

* * * * *